United States Patent [19]

Herum et al.

[11] Patent Number: 5,131,796
[45] Date of Patent: Jul. 21, 1992

[54] SECURITY FASTENER FOR THREADED OBJECTS

[76] Inventors: Roger A. Herum, Box 171, Wallingford, Iowa 51365; Douglas E. Herum, Box 157, R.R. 3, Estherville, Iowa 51335

[21] Appl. No.: 549,686

[22] Filed: Jul. 6, 1990

[51] Int. Cl.[5] ............... F16B 39/12; F16B 41/00
[52] U.S. Cl. ................. 411/222; 411/237; 411/431; 411/910; 29/525.1
[58] Field of Search ............ 411/222, 237, 431, 432, 411/372, 377, 429, 403, 910, 931; 29/525.1

[56] References Cited

U.S. PATENT DOCUMENTS

| | | | |
|---|---|---|---|
| 916,298 | 3/1909 | Gifford | 411/222 |
| 926,504 | 6/1909 | Moodie | 411/237 |
| 993,865 | 5/1911 | Oliver | 411/931 |
| 1,631,489 | 6/1927 | Kiewicz | 411/910 |
| 2,316,695 | 4/1943 | Jaffa | 411/910 |
| 2,708,844 | 5/1955 | Cincel | 411/910 |
| 3,034,386 | 5/1962 | Corlètt et al. | 411/910 |
| 4,732,517 | 3/1988 | Crouch et al. | 411/910 |
| 4,742,702 | 5/1988 | Swertz | 411/910 |

FOREIGN PATENT DOCUMENTS

| | | | |
|---|---|---|---|
| 2095356 | 9/1982 | Brazil | 411/910 |
| 2210124 | 6/1989 | United Kingdom | 411/910 |

*Primary Examiner*—Neill R. Wilson
*Attorney, Agent, or Firm*—Zarley, McKee, Thomte, Voorhees & Sease

[57] ABSTRACT

An improved fastener is provided for mounting an object to a base, wherein the object has a threaded shaft extending through a hole in the base. The fastener includes a collar having a side wall, a first end with a threaded aperture for receipt on the shaft, and an open second end defining a cavity within the collar. A locknut received within the cavity of the collar has a first end with a threaded aperture therein for receipt on the shaft so as to cooperate with the collar in a double-nut arrangement. The second end of the locknut has a key recess therein for receiving a key socket or key wrench for tightening the locknut. The collar covers the locknut so as to prevent removal of the locknut and the collar without use of the key socket or key wrench.

9 Claims, 2 Drawing Sheets

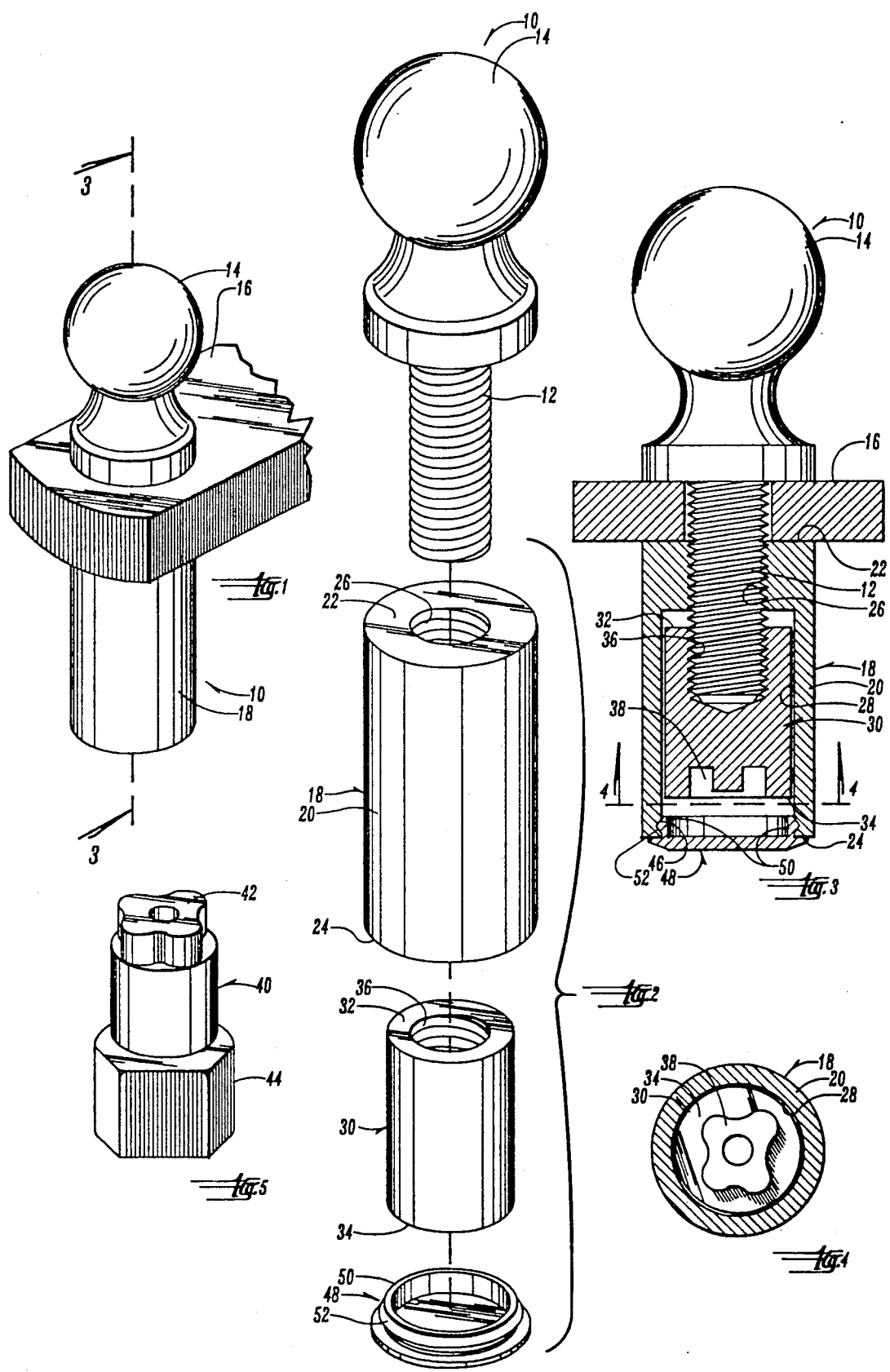

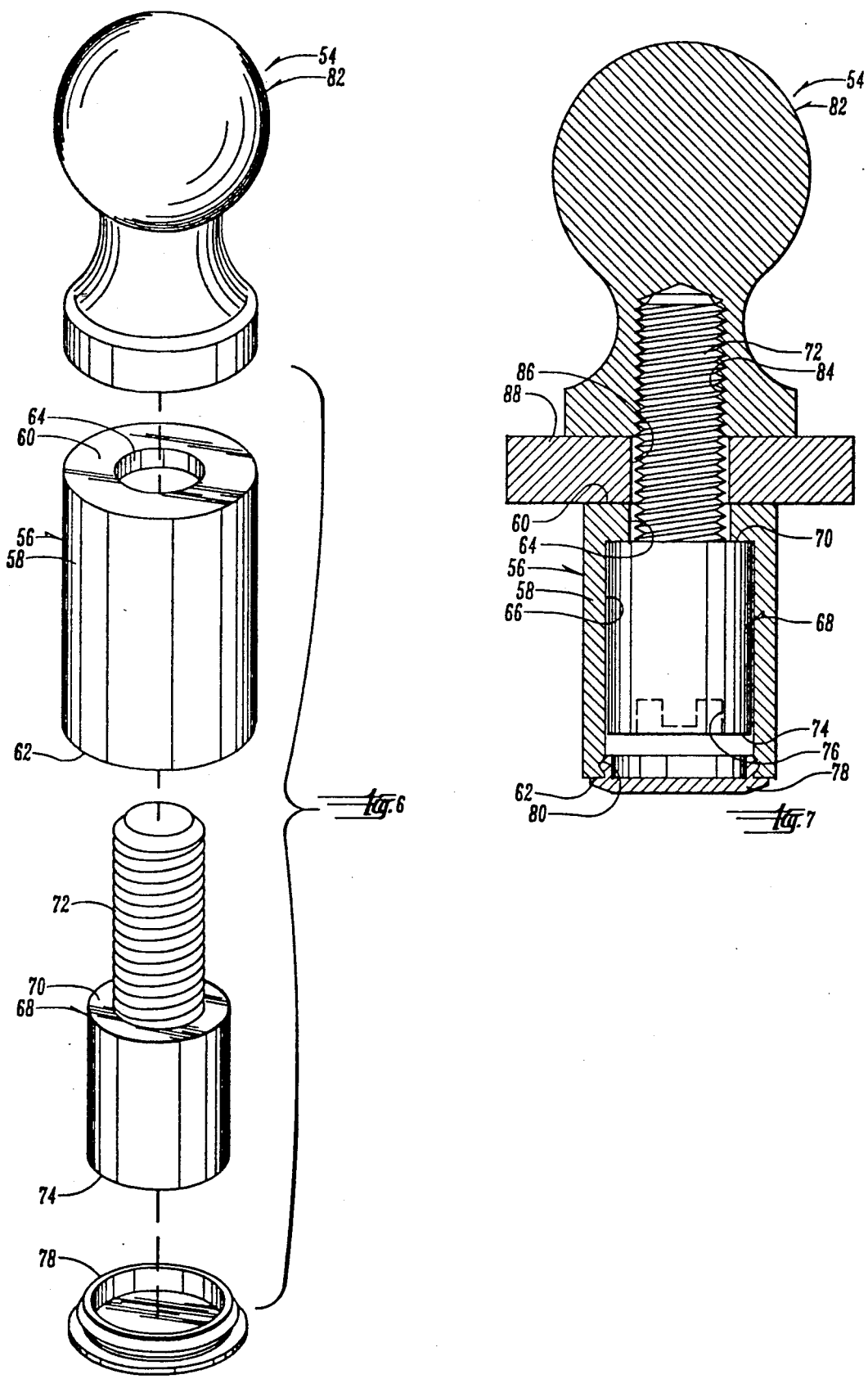

SECURITY FASTENER FOR THREADED OBJECTS

BACKGROUND OF THE INVENTION

A bolt or other threaded shaft is often used in conjunction with a nut to fasten two objects together. For example, a ball hitchball for a trailer hitch generally includes a threaded shaft which extends through a hole in a bumper and is secured to the bumper by a nut. Similarly, a flashing road hazard light is connected to a stand or A-frame with a nut and bolt assembly. The nut is generally exposed or easily accessible, and therefore can be easily removed with a wrench. Unfortunately, the ease of mounting provided by the nut and bolt assembly also allows quick and easy removal of the nut for theft of the object being secured. The object, such as a hitchball or road hazard light, then must be replaced, and can be easily stolen again.

Therefore, a primary objective of the present invention is the provision of an improved security fastener for connecting or mounting objects.

Another objective of the present invention is the provision of a fastener which can be quickly and easily installed and disassembled with the use of a unique socket and wrench.

Still another objective of the present invention is the provision of an improved fastening device which prevents theft of the objects being fastened.

A further objective of the present invention is the provision of a fastening device which is secure in use, yet inexpensive to manufacture.

These and other objectives will become apparent from the following description of the invention.

SUMMARY OF THE INVENTION

An improved security fastener is provided for securely fastening two objects together and for preventing theft of either object. The fastener comprises a collar with a threaded aperture for receipt on a threaded shaft. The shaft is connected to one object and extends through the other object, or alternatively, is on a bolt extending through both objects. The collar has a cavity to receive a capnut or locknut. The capnut has a threaded aperture for receipt on the threaded shaft within the cavity of the collar. The end of the capnut is closed and has a recess for receiving a socket. The socket has a first end for mating with the recess of the capnut and an opposite end to receive a wrench to rotate the socket and the capnut. The collar and locknut act as a double-nut assembly to prevent the collar from being removed from the shaft without first removing the capnut.

In use, the security fastener enables any object, which can be fastened to another object or frame by a nut and bolt-type assembly, to be securely fastened in a manner which is not only quick and easy, but also tamperproof. A threaded shaft connected to or extending through the object is extended through the frame and is secured thereto by threading the collar onto the shaft. The capnut is then threaded onto the shaft into the cavity of the collar with the keyed socket. The socket is removed and a cap is placed on the end of the collar to keep foreign matter, such as dirt, out of the cavity. Due to the double nut arrangement, the collar may not be removed from the threaded shaft unless the capnut is first removed from the shaft with the keyed socket. Therefore, the object is safe from theft.

BRIEF DESCRIPTION OF THE DRAWINGS

FIG. 1 is a perspective view of the present invention being used in conjunction with a hitch ball of a trailer hitch.

FIG. 2 is an exploded perspective view of the present invention in conjunction with a hitch ball.

FIG. 3 is a sectional view taken along lines 3—3 of FIG. 1.

FIG. 4 is a sectional view taken along lines 4—4 of FIG. 3.

FIG. 5 is a perspective view of the key socket.

FIG. 6 is an exploded perspective view of an alternative embodiment of the present invention used in conjunction with a different style hitchball.

FIG. 7 is a sectional view of the alternative embodiment shown in FIG. 6.

DESCRIPTION OF THE PREFERRED EMBODIMENT

Referring to the drawings, the fastener of the present invention is generally designated by the reference numeral 10. Fastener 10 is designed for use on a threaded shaft 12. In the drawings, shaft 12 is shown as an extension of a hitch ball 14 mounted on a hitch tongue 16. It is understood that shaft 12 can be a bolt or connected to any other object which is intended to be fastened to a base, or frame, or support.

Fastener 10 includes a collar 18 which has a cylindrical side wall 20, a first end 22, and an opposite second end 24. First end 22 has a threaded aperture 26, while second end 24 is open so as to define a cavity 28 within collar 18.

Fastener 10 also includes a capnut or locknut 30 having opposite first and second ends 32 and 34, respectively. First end 32 includes a threaded aperture 36 extending partially into 30, while second end 34 has a uniquely shaped key recess 38.

Capnut 30 has a diameter slightly less than the diameter of cavity 28 such that capnut 30 can be received within the cavity of collar 18, as seen in FIG. 3. A key socket 40 having a head 42 with a complimentary shape to recess 38 is provided for threading capnut 32 on and off of shaft 12. Socket 40 has an end 44 for receipt of a wrench so as to apply torque to the socket, and thus to capnut 30. Alternatively, a handle (not shown) can be provided on key socket 40 for turning the capnut.

A groove 46 is provided around the perimeter of cavity 28 adjacent the second end 24 of collar 18. A cap 48 having a perimeter flange with a bead or projection 52 thereon can be snap fit onto the second end 24 of collar 18 such that the bead 52 is received within groove 46. Cap 48 prevents dirt and other foreign matter from entering cavity 28.

In use, the shaft 12, such as that connected to hitch ball 14, is extended through the support means, such as hitch tongue 16. Collar 18 is threaded onto shaft 12 such that first end 22 abuts tongue 16. Capnut or locknut 30 is then threaded onto shaft 12 so as to be received within cavity 28. Socket 40 is used to tighten capnut 30 in place. Cap 48 can then be snap fit onto collar 18. Thus, hitch ball 14 is securely mounted on hitch tongue 16.

In order to remove hitch ball 14 from tongue 16, cap 48 is pried from second end 24 of collar 18 with any convenient flat tool, such as a knife or screwdriver. Socket 40 is then inserted into second end 24 of collar 18 such that the head 42 matingly engages the recess 38 of capnut 30. Socket 40 can then be turned with a wrench to loosen and remove capnut 30. Collar 18 can then be removed from shaft 12. A pipe wrench or locking pliers can be used to loosen collar 18 from shaft 12, if necessary.

Fastener 12 is theft-proof, absent use of key socket 40. Each capnut 30 and key socket 40 has a unique recess and head design, such as is common with locking hubcaps. Thus, collar 18 cannot be removed without first removing capnut 30, which requires use of the specially designed key socket 40. A potential thief who tries to turn collar 30 with a pipe wrench or locking pliers will only be able to turn the collar a short distance until it engages first end 32 of capnut 30. Upon such engagement, collar 18 and capnut 30 act as a double nut arrangement such that further turning of collar 18 is prevented. Thus, hitch ball 14, or other objects fastened by fastener 10, cannot be stolen.

An alternative security fastener 54 is shown in FIGS. 6 and 7. Fastener 54 includes a collar 56 having a side wall 58, a first end 60, and a second end 62. First end 60 includes an aperture 64 therein, while second end 62 is open, so as to define a cavity 66 within collar 56. A bolt 68 includes a head having a first end 70 with a threaded shaft 72 extending therefrom, and a second end 74 with a key recess 76 formed therein. A cap 70, similar to cap 48, is provided for snap fitting into a groove 80 formed within side wall 58 of collar 56 adjacent second end 62 thereof.

Fastener 54 is useful in securing objects having threaded aperture to a mounting base or frame. For example, as seen in FIG. 6 and 7, a hitch ball 82 is provided with a threaded aperture 84 therein. Bolt 68 is inserted into the cavity 66 of collar 56 such that shaft 72 extends through aperture 64 in the collar. Shaft 72 also extends through a hole 86 in hitch tongue 88 so that hitch ball 82 can be threaded upon shaft 72. A key socket, similar to socket 40 described previously, is used to tighten bolt 68. Cap 78 can then be snap fit into the open second end 62 of collar 56 so as to keep dirt and other foreign matter from entering cavity 66.

Fastener 54 prevents ball hitch 82 from being stolen, since collar 56 cannot be removed without first removing bolt 68. However, bolt 68 can only be removed with use of the unique key socket. Accordingly, a potential thief who does not have the key socket cannot unfasten fastener 54.

From the foregoing, it can be seen that the present invention accomplishes at least all of the stated objectives.

What is claimed is:

1. A fastener for use on a threaded shaft, comprising:
   a collar having a sidewall, a first end with a threaded aperture for receipt on the shaft and an open second end;
   a nut having a threaded aperture for receipt on the shaft and a closed end with a key recess therein for matingly receiving a key socket; and
   the collar having a cavity therein to receive the nut such that the collar covers the nut when the nut is threaded on the shaft.

2. The fastener of claim 1 wherein the diameter of the nut is slightly smaller than the diameter of the cavity of the collar.

3. The fastener of claim 1 wherein the collar has an outer cylindrical surface.

4. The fastener of claim 1 wherein the socket includes a first end for mating with the recess of the nut and a second opposite end for receiving a crank arm to rotate the socket and nut.

5. The fastener of claim 1 wherein an end cap is mounted on the collar over the second end thereof to cover the cavity of the collar.

6. The fastener of claim 1 wherein the tightening means is a key socket having a first end for mating with the recess of the nut and a second opposite end for receiving a crank arm to rotate the socket and nut.

7. The fastener for mounting an object to a base, the object having a threaded shaft adapted to extend through a hole in the base, the fastener comprising:
   a collar having a sidewall, a first end with a threaded aperture, and an open second end defining a cavity within the collar;
   a nut having a first end with a threaded aperture and a closed end with a key recess therein for matingly receiving the tightetning means;
   the nut being adapted to reside within the cavity of the collar;
   the collar and nut being adapted to be threaded onto the shaft of the object with the nut residing within the cavity of the collar; and
   means for tightening the nut onto the shaft.

8. A method of fastening a first object to a second object, the first object including a threaded shaft and the second object having an aperture through which the shaft extends, the method comprising:
   threading a collar onto the shaft or on the opposite side of the second object from the first object, the collar having a cylindrical side wall and an open end defining a cavity within the collar;
   inserting a nut into the cavity of the collar, the nut including a closed end with a key recess therein;
   threading the nut onto the shaft such that the nut is housed within the cavity and surrounded by the sidewall of the collar; and tightening the nut with a key socket having a head matingly received within the key recess of the nut.

9. The method of claim 8 further comprising covering the open end of the collar with a cap.

* * * * *